US007996128B2

(12) United States Patent
Bertosa et al.

(10) Patent No.: US 7,996,128 B2
(45) Date of Patent: Aug. 9, 2011

(54) USER CONFIGURABLE SCAN TOOL

(75) Inventors: Thomas Bertosa, Chardon, OH (US); Michael Gessner, Akron, OH (US); Hamid Namaky, South Russell, OH (US)

(73) Assignee: SPX Corporation, Charlotte, NC (US)

( * ) Notice: Subject to any disclaimer, the term of this patent is extended or adjusted under 35 U.S.C. 154(b) by 861 days.

(21) Appl. No.: 11/790,752

(22) Filed: Apr. 27, 2007

(65) Prior Publication Data

US 2008/0270075 A1 Oct. 30, 2008

(51) Int. Cl.
*G06F 7/00* (2006.01)
*G01M 17/00* (2006.01)

(52) U.S. Cl. .......................................... 701/33; 701/183

(58) Field of Classification Search .............. 701/29–36; 702/182–185
See application file for complete search history.

(56) References Cited

U.S. PATENT DOCUMENTS

| | | | | |
|---|---|---|---|---|
| 6,687,782 | B1 * | 2/2004 | Normile | 711/2 |
| 7,272,475 | B2 * | 9/2007 | Gawlik et al. | 701/29 |

* cited by examiner

*Primary Examiner* — Yonel Beaulieu
(74) *Attorney, Agent, or Firm* — Baker & Hostetler LLP

(57) ABSTRACT

A diagnostic tool for a vehicle, includes a signal translator communicating with the vehicle in at least one protocol, an input device, a processor controlling a software according to the input information and communication with the vehicle from the signal translator, the processor controlling a reception of diagnostic data of the vehicle through the signal translator, the processor receiving a selected information of a user and configuration of the diagnostic tool through the input device and correlating the configuration information with the user information, the processor processing the received diagnostic data according to the selected configuration information corresponding to the selected user by the input unit, a memory storing a software controlled by the processor, the memory storing the configuration information according to the corresponding user information, and a display unit receiving and displaying diagnostic information according to the selected stored configuration information according to the user.

25 Claims, 4 Drawing Sheets

USER CONFIGURABLE SCAN TOOL

FIELD OF THE INVENTION

The present invention relates generally to an automotive diagnostic tool. More particularly, the present invention relates to an automotive diagnostic tool being user configurable.

BACKGROUND OF THE INVENTION

Onboard control computers have become prevalent in motor vehicles, but as safety, economy, and emissions requirements have continued to tighten, friction braking systems, and traction control devices have not met the requirements set out in government regulations and the implicit demands of competitors' achievements. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools can detect faults based on Diagnostic Trouble Codes or DTCs that are set in the vehicle's onboard control computer. A DTC can be triggered and stored when there is a problem with the vehicle. A technician then retrieves the DTC using a diagnostic tool, repairs the associated problem and then deletes the DTC from the vehicle's computer.

The current diagnostic tools have become very complicated because of the increase in the number of features. It is desirable for a user to configure the tool in the way that best helps the technician to perform vehicle diagnostics. However, the current diagnostic tools fail to provide an easy manner of allowing a user to cope with the increased array of configurations within a diagnostic tool.

The current diagnostic tool are very limited on how they can be controlled. The current diagnostic tools power up in the same way and in the same order. There is very little control that a user has over the diagnostic tools. Another problem is that each user may have a different set of expertise and priorities in dealing with the different configurations of a diagnostic tool.

Accordingly, it is desirable to provide a method and apparatus that will allow a user greater control and in a helpful manner with regard to all the capabilities of the diagnostic tool. Further, it is also desirable that such control can be modified with respect to the technician.

SUMMARY OF THE INVENTION

The foregoing needs are met, to a great extent, by the present invention, wherein in one aspect a technique and apparatus are provided that will allow a technician to use a diagnostic tool to determine the nature of a problem, with the ability to configure the diagnostic tool with respect to the particular technician.

In accordance with one embodiment of the present invention, a diagnostic tool for diagnosing a vehicle, includes a signal translator that communicates with the vehicle in at least one protocol, an input device that inputs information, a processor that controls a software according to the input information from the input device and communicates with the vehicle with the signal translator, the processor controls a reception of diagnostic data of the vehicle through the signal translator, the processor receives a selected identification information of a user and configuration of the diagnostic tool through the input device and correlates the desired configuration information with the user information, the processor processes the received diagnostic data according to the selected configuration information corresponding to the user information, a memory that stores the software controlled by the processor, the memory storing the configuration information according to the corresponding user information, and a display unit that receives and displays diagnostic information according to the selected stored configuration information according to the user information.

In accordance with another embodiment of the present invention, a method of operating a diagnostic tool for a vehicle, including linking the diagnostic tool with a diagnostic computer of the vehicle through a data link connector of the vehicle, communicating with the diagnostic computer of the vehicle in a communication protocol, receiving a selected identifying information of a user and configuration of the diagnostic tool and correlating the configuration information with the user information, processing the received diagnostic data according to the selected configuration information corresponding to the selected user information, storing the configuration information according to the corresponding user information, and displaying diagnostic information according to the selected stored configuration information according to the user information.

In accordance with yet another aspect of the present invention, a system for a diagnostic tool of a vehicle, including a means for linking the diagnostic tool with a diagnostic computer of the vehicle through the data link connector of the vehicle, a means for communicating with the diagnostic computer of the vehicle in a communication protocol, a means for receiving a selected information of a user and configuration of the diagnostic tool and correlating the configuration information with the user information, a means for processing the received diagnostic data according to the selected configuration information corresponding to the selected user information, a means for storing the configuration information according to the corresponding user information, and a means for displaying diagnostic information according to the selected stored configuration information according to the user information.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
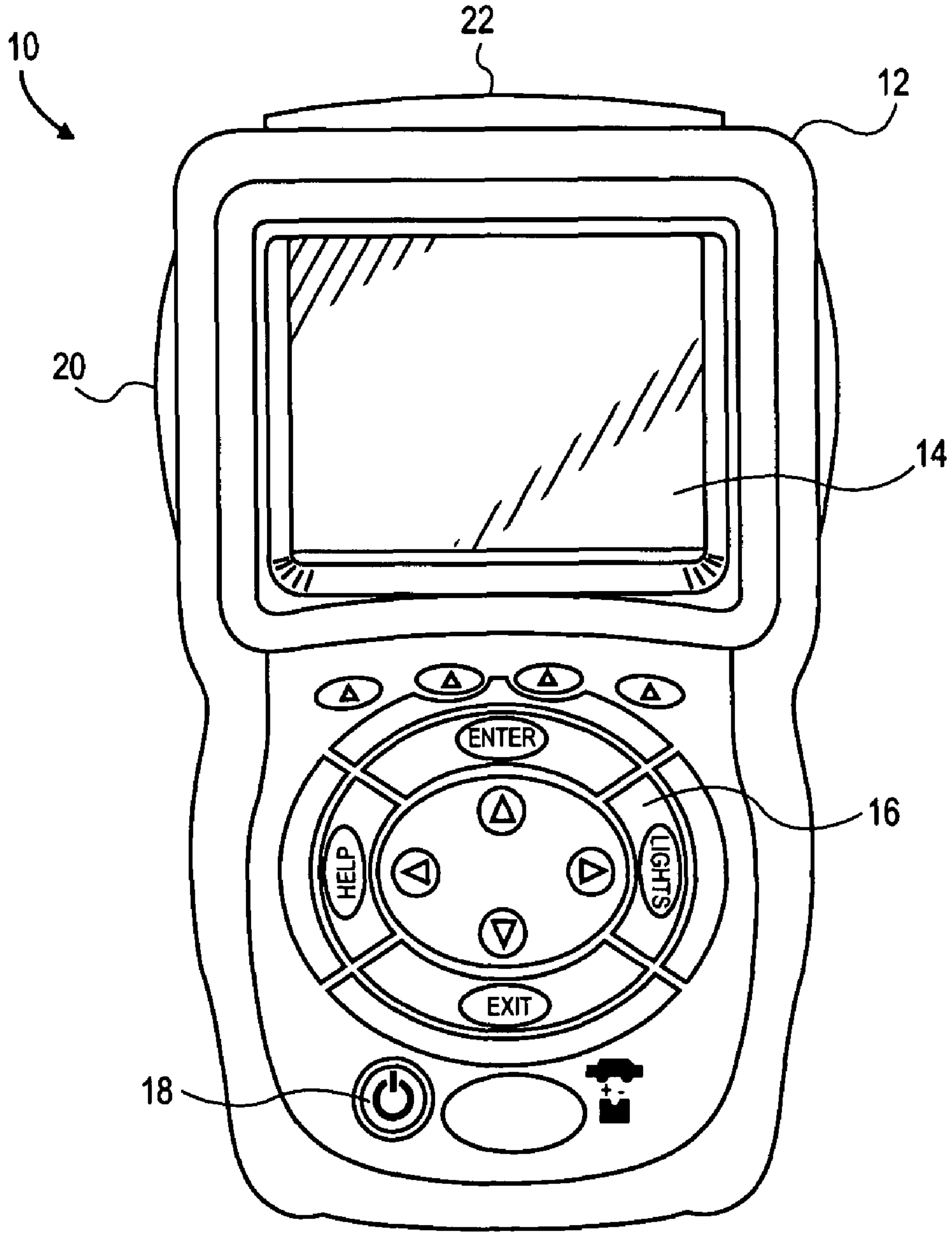
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus and method that will allow a user, such as a technician, to use a diagnostic tool to determine the nature of a problem, and the tool being configurable according to the user or group of users.

Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems of using the diagnostic tool since there are limitations in the manner a diagnostic tool can be configured. In an embodiment of the present invention, the diagnostic tool can be configured for all the available functions of the diagnostic tool for each particular user or group of users.

An embodiment of the present inventive apparatus is illustrated in FIG. 1. In particular, FIG. 1 is a front view illustrating a diagnostic tool 10 according to an embodiment of the invention. The diagnostic tool 10 can be any computing device, for example, the NEMISYS diagnostic tool from SERVICE SOLUTIONS (part of the SPX Corporation). The diagnostic tool 10 includes a housing 12 to encase the various components of the diagnostic tool 10, such as a display 14, a user interface 16, a power button 18, a memory card reader 20 and a connector interface 22. The display 14 can be any type display, including for example but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the diagnostic tool 10. The user interface 16 allows the user to interact with the diagnostic tool 10, in order to operate the diagnostic tool as the user prefers. The user interface 16 can include function keys, arrow keys or any other type of keys that can manipulate the diagnostic tool 10 in order to operate the diagnostic tool through the software. The user interface or input device 16 can also be a mouse or any other suitable input device for the user interface 16, including a keypad, touchpad, etc. The user interface 16 can also include keys correlating to numbers or alphanumeric characters. Moreover, as mentioned above, when the display 14 is touch sensitive, the display 14 can supplement or even substitute for the user interface 16. The power key or button 18 allows the user to turn the power to the diagnostic tool 10 on and off, as required.

A memory card reader 20 can be a single type card reader, such as, but not limited to, a compact flash card, floppy disk, memory stick, secure digital, flash memory or other type of memory. The memory card reader 20 can be a reader that reads more than one of the aforementioned memory such as a combination memory card reader. Additionally, the card reader 20 can also read any other computer readable medium, such as CD (compact disc), DVD (digital video or versatile disc), etc.

The connector interface 22 allows the diagnostic tool 10 to connect to an external device, such as, but not limited to, an ECU (electronic control unit) of a vehicle, a computing device, an external communication device (such as a modem), a network, etc. through a wired or wireless connection. Connector interface 22 can also include connections such as a USB (universal serial bus), FIRFWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

Figure 2:
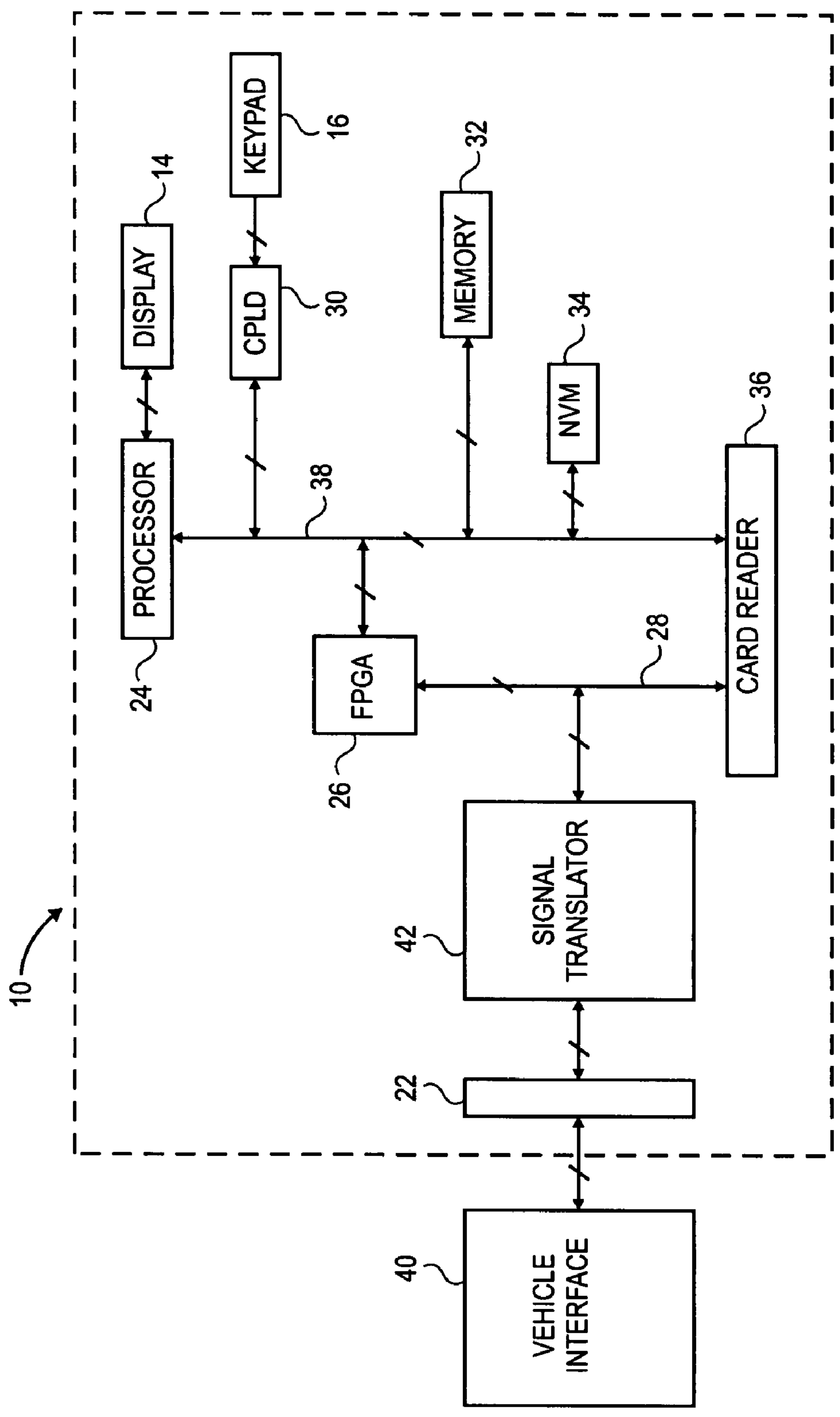
FIG. 2 is a block diagram of the components of a diagnostic tool.

FIG. 2 is a block diagram of the components of a diagnostic tool 10. In FIG. 2, the diagnostic tool 10, according to an embodiment of the invention, includes a processor 24, a field programmable gate array (FPGA) 26, a first system bus 28, the display 14, a complex programmable logic device (CPLD) 30, the user interface 16 in the form of a keypad, a memory subsystem 32, an internal non-volatile memory (NVM) 34, a card reader 36, a second system bus 38, the connector interface 22, and a selectable signal translator 42. A vehicle communication interface 40 is in communication with the diagnostic tool 10 through connector interface 22 via an external cable. The connection between the vehicle communication interface 40 and the connector interface 22 can also be a wireless connection such as BLUETOOTH, infrared device, wireless fidelity (WiFi, e.g. 802.11), etc.

The selectable signal translator 42 communicates with the vehicle communication interface 40 through the connector interface 22. The signal translator 42 conditions signals received from a motor vehicle control unit through the vehicle communication interface 40 to a conditioned signal compatible with the diagnostic tool 10. The translator 42 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 26 (e.g., by tri-stating unused transceivers) or by providing a keying device that plugs into the connector interface 22 that is provided by diagnostic tool 10 to connect diagnostic tool 10 to vehicle communication interface 40. Translator 42 is also coupled to FPGA 26 and the card reader 36 via the first system bus 28. FPGA 26 transmits to and receives signals (i.e., messages) from the motor vehicle control unit through the translator 42.

FPGA 26 is coupled to the processor 24 through various address, data and control lines by the second system bus 38. FPGA 26 is also coupled to the card reader 36 through the first system bus 28. Processor 24 is also coupled to the display 14 in order to output the desired information to the user. The processor 24 communicates with the CPLD 30 through the second system bus 38. Additionally, the processor 24 is programmed to receive input from the user through the user interface 16 via the CPLD 30. The CPLD 30 provides logic for decoding various inputs from the user of diagnostic tool 10 and also provides the glue-logic for various other interfacing tasks.

Memory subsystem 32 and internal non-volatile memory 34 are coupled to the second system bus 38, which allows for communication with the processor 24 and FPGA 26. Memory subsystem 32 can include an application dependent amount of dynamic random access memory (DRAM), a hard drive, and/or read only memory (ROM). Software to run the diagnostic tool 10 can be stored in the memory subsystem 32. The internal non-volatile memory 34 can be, but not limited to, an electrically erasable programmable read-only memory (EEPROM), flash ROM, or other similar memory. The internal non-volatile memory 34 can provide, for example, storage for boot code, self-diagnostics, various drivers and space for FPGA images, if desired. If less than all of the modules are implemented in FPGA 26, the non-volatile memory 34 can contain downloadable images so that FPGA 26 can be reconfigured for a different group of communication protocols.

Figure 3:
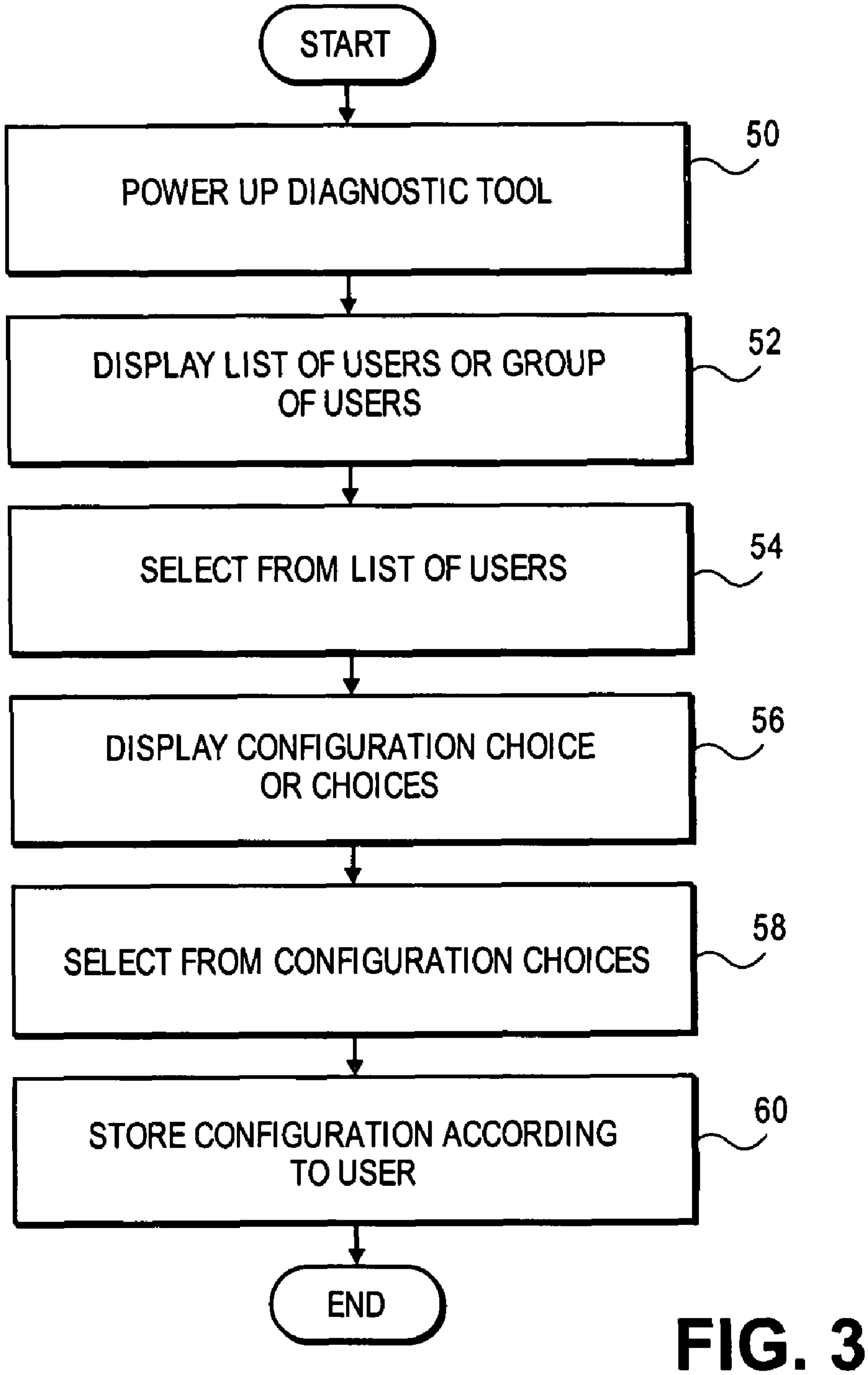
FIG. 3 is a flow diagram of a diagnostic tool illustrating configuration of the diagnostic tool according to the user.

FIG. 3 is a flow diagram illustrating one embodiment of the present invention. In particular, FIG. 3 illustrates the technique of configuring the diagnostic tool 10.

The diagnostic tool 10 of the present invention can be configured to the user's specified manner. The user configurable diagnostic tool 10 will allow the user to diagnose the vehicle faster and thus be able to repair the vehicle faster. It is possible to have a programmable key to configure what functions to perform in a user specified manner. It is possible to create a login so the diagnostic tool 10 becomes multi-user.

The user might always want to view vehicle diagnostic data after reading codes for example. The user then has the power to put functions in any order and on any menu of choices. The user can configure how many systems that the diagnostic tool 10 can read/erase codes, for example powertrain, chassis, body, etc. Then, with one programmable key press, all the DTCs are retrieved from the previous selected systems. When the user sets the contrast setting, units and various other settings, they will be retained for that user's login. If the user wants the ability to show live data parameters between and engine module and ABS (anti-lock braking system) brake module, the user can configure the diagnostic tool 10 to accomplish this feature. The user can get only the information they want in the way that they want and thus fix the vehicle more efficiently.

The diagnostic tool 10 of the present invention has multiple logins so different individuals can configure the tool to their own preferences. For example, this includes, but is not limited to the order in which functions appear in the menus, contrast adjustment, brightness, volume, key activation (active on key press or release), power off timer, units, language, and programmable hard and soft keys.

Referring to FIG. 3, for example, a user may start by powering up the diagnostic tool 10 (step 50). After powering up the diagnostic tool 10, the diagnostic tool can then enter automatically the following steps or they can be manually selected, depending on the user's preference. The order of the steps are not limiting, but are shown as an example. When the diagnostic tool 10 is powered up, the user is shown on the display 14, a list of user names to choose from (Step 52). The user can be defined according to either a single user or a group of users. With regard to the group of users, for example the group can be one particular shop working on certain trucks and another shop working on cars or another manufacturer of trucks or cars. Additionally, the group of users can be different facilities working on different types of vehicles. Therefore, the user option can be a plurality of other variables including also vehicle type, vehicle make, year of model, multiple users of a certain type, older vehicles, newer vehicles, land vehicles, large vehicles, small vehicles, etc. These are examples and therefore, the term "user" is not limited to a single user for selection of the type of user.

Then, the user may choose from the list displayed, or enter a new user name through the input unit 16 (Step 54). The processor 24 will then label a set configuration file for that particular user. A set of options can be entered for the new user to be stored on the non-volatile memory 32. The particular user selected will correspond to the selected configurations. Thereby, the diagnostic tool will be customized quickly for each user or set of users.

The user is then set to enter the configuration items that will be saved, for example, according to the user. The user can enter information of the desired configuration through the input device 16. The configuration that is chosen by the user is controlled through the processor 24. The information or configuration that is programmed can be in the memory 32 and saved to the non-volatile memory 32 of the diagnostic tool 10.

For example, a set of configuration choices are displayed on the display 14 of the diagnostic tool 10 for entry (Step 56). The user can then pick and choose items from the configuration choices (Step 58). The configuration choices can be shown by either an overall menu of all functions of the diagnostic tool for entry at the same time, or options are given as the user uses the diagnostic tool 10. After the particular configuration is chosen, the user is requested to save the information (Step 60). The configuration is then saved, as mentioned above to the non-volatile memory 34. Additionally, the configuration can be stored in the random access memory 32, which can be backed up by a battery or capacitor that keeps the configuration file in the memory unit.

The processor 24 will correlate the information of the user or group of users with the corresponding configuration information and store the data according to the particular user or group of users. Therefore, when the diagnostic tool 10 is powered up and used and a particular user or group of users are selected, the preset saved file of the configuration information is retrieved and applied to the diagnostic tool 10 by the processor 24 from the non-volatile memory 34, and the diagnostic tool will run according to the configuration information. The saved user configuration file can be applied in terms of a login, for example. Therefore, when the diagnostic tool 10 is powered on, a user login can be prompted for entry. When the user is entered, the configuration file is then applied to the diagnostic tool.

Figure 4:
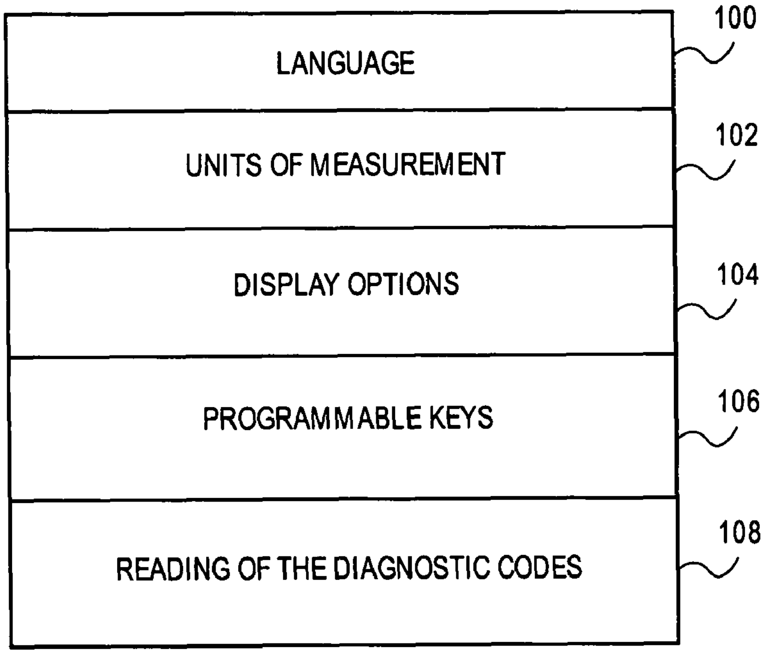
FIG. 4 illustrates example functions of the diagnostic tool that can be configured according to the embodiment of FIG. 3.

FIG. 4 illustrates example functions of the diagnostic tool that can be configured according the embodiment of FIG. 3. Referring to FIG. 4, a user can be shown on the display 14, a set of options that be can stored according to the user or other predetermined variable. For example, the menu can include a language selection 100, where the user can select the language in which the diagnostic tool 10 displays on the display. The display 14 can show a list of languages (i.e., English, French, Spanish, etc.) to use for the diagnostic tool 10. After selecting the language, the menu can revert back to the main menu automatically, or the user can be given the option of going back to the main menu manually.

Another configuration option can be units 102 that are used for the measurements, etc., in the diagnostic tool 10. For example, if the units used for the diagnostic tool is to be in metric units, such an option can be chosen ahead of time, or if liters rather than cubic centimeters are to be used, such an option can be made, or pressure to be pounds per square inch.

The contrast and sound can be chosen by selecting a multimedia option 104 which will allow storage of a particular contrast level and sound level, for the particular user. Thereby, such a customized configuration, allows the user to be more efficient in that the user does not have spend the time each time they use the diagnostic tool to customize for the particular use for sound, display and other variables.

Another configuration option can be to configure a programmable key 106. For example, the user can choose a user key and choose a macro or script to assign to that particular key. The assignment can be chosen from an array of functions that are provided by the diagnostic tool 10.

Figure 5:
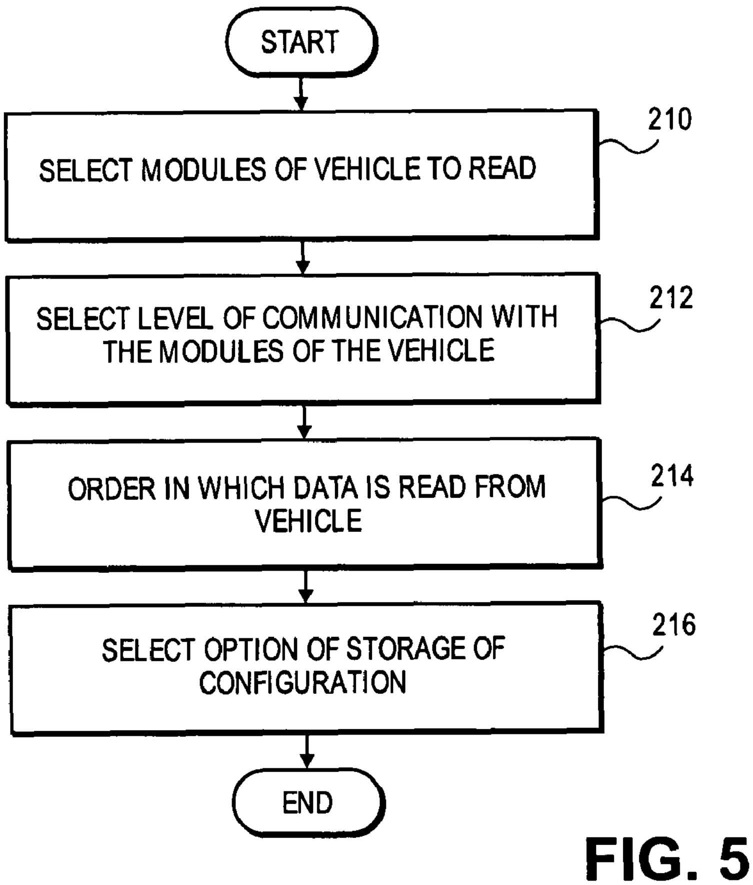
FIG. 5 is a flow diagram of the diagnostic tool illustrating further functions that can be configured.

Yet another example of a configuration option is for the manner in which the configuration tool reads the codes 108. FIG. 5 is a flow diagram of the diagnostic tool illustrating further functions that can be configured. Referring to FIG. 5, for example, the user can choose to have the diagnostic tool 10 to not read the engine codes, or to read only the engine codes, or read both the engine codes and the codes for other modules in the vehicle, or a particular set of modules in the vehicle. Therefore, the user can choose the modules to read, whether it is module 1, module 2, up to module n (Step 210).

The user can change the level of communication with certain modules in the vehicle including for example the powertrain control module (PCM), the transmission control module (TCM), the electro/mechanical instrument cluster (MIC), the airbag control module (ACM), the Antilock brake Module (CAB), etc (Step 212). Here, the user can set the configuration to what particular modules are selected by the user that the diagnostic tool 10 will poll.

The user can also select the order in which the data is read (Step 214), or the order in which the functions of the diagnostic tool 10 is performed. For example, if one particular type of module in a vehicle is read first and the second type of module is not read, and then the third type of module is read for information last.

The user may not want all the diagnostic capabilities of a module or only certain portions. For example, the user can change the function to read all the power train modules or just one.

Additionally, the user can indicate whether the option chosen is a one time option or it will be the default option to be used every time (Step 216).

As mentioned above, the options for the configurations can be chosen either through a menu showing all options or when the user performs certain functions, then a configuration option is shown and it is saved either for the present use or for permanent storage.

Further, the diagnostic tool 10 can be used to count check engine light flashes for older vehicles that use manual codes instead of serial codes. The count check engine light flashes can be chosen in the options of the configuration and how to deal with the older year models of the vehicles.

The diagnostic tool 10 can transmit such configuration information either wirelessly (IEEE (Institute of Electrical and Electronics Engineers) 802.11, BLUETOOTH, etc.) or through wired method (category 5, 6, 7 Ethernet cable where category 7 cable is for a 10 gigabit transfer) to an access point such as a router or hub for the Internet for storage of the saved configuration information outside of the diagnostic tool 10. For example, the connector interface 22 can be used also to connect wirelessly or through a wired connection to the access point for network connection or simply to another PC for storage or retrieval of the configuration information.

The software running in the diagnostic tool 10 in the memory 32 and controlled by processor 24, includes the process for receiving the configuration information and saving the configuration information according to the user in the non-volatile memory 34.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface, modem or other interface that accommodates a connection to another computer or network such as the Internet. The system bus may also include an input and output interface that accommodates connection to a variety of other devices.

Although an example of the diagnostic tool is shown using a user limited configuration, it will be appreciated that other techniques for providing the configuration are available for a particular variable other than the type of user or the particular user. Also, the diagnostic tool is useful to diagnose a vehicle and provide such information to the user in an efficient manner, taking into account the different configurations for the functions for any particular variable.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:

a signal translator that communicates with the vehicle in at least one protocol;

an input device that inputs information;

a processor that controls a software according to the input information from the input device and communicates with the vehicle with the signal translator, the processor controls a reception of diagnostic data of the vehicle through the signal translator, the processor receives a selected identification information of a user and configuration of the diagnostic tool through the input device and correlates the desired configuration information with the user information, the processor processes the received diagnostic data according to the selected configuration information corresponding to the user information;

a memory that stores the software controlled by the processor, the memory storing the configuration information according to the corresponding user information; and a display unit that receives and displays diagnostic information according to the selected stored configuration information according to the user information.

2. The diagnostic tool of claim 1, wherein the memory further comprising of a volatile memory unit and a non-volatile memory unit, the non-volatile memory unit storing the configuration information according to the user information.

3. The diagnostic tool of claim 1, wherein the processor accepts a selection of a stored configuration according to the user information and processes the diagnostic data according to the stored configuration.

4. The diagnostic tool of claim 1, wherein the configuration information includes any one of a display configuration and reading of the diagnostic data.

5. The diagnostic tool of claim 4, wherein reading of diagnostic data includes the order of reading the diagnostic data.

6. The diagnostic tool of claim 4, wherein reading of diagnostic data includes selecting and communicating with certain modules of the vehicle from a plurality of modules.

7. The diagnostic tool of claim 1, further comprising of a housing encasing the signal translator, the input device, the processor, the memory, and the display unit.

8. The diagnostic tool of claim 1, further comprising a connector interface that connects the signal translator with a vehicle interface through one of a wired and wireless link to allow for recording of the diagnostic data between the diagnostic tool and the vehicle.

9. The diagnostic tool of claim 8, wherein diagnostic trouble codes detected are displayed through the display according to the user information, where the user information includes a single user or a group of users, the group of users being defined by a certain common criteria.

10. A method of operating a diagnostic tool for a vehicle, comprising:

linking the diagnostic tool with a diagnostic computer of the vehicle through a data link connector of the vehicle;

communicating with the diagnostic computer of the vehicle in a communication protocol;

receiving a selected identifying information of a user and configuration of the diagnostic tool and correlating the configuration information with the user information;

processing a received diagnostic data according to the selected configuration information corresponding to the selected user information;

storing the configuration information according to the corresponding user information; and displaying diagnostic information according to the selected stored configuration information according to the user information.

11. The method of claim 10, wherein storing the configuration information according to the user information is stored in a non-volatile memory unit.

12. The method of claim 10, further comprising accepting a selection of the stored configuration according to the user information and processing the diagnostic data according to the selected stored configuration.

13. The method of claim 10, wherein the configuration information includes any one of a display configuration and reading of the diagnostic data.

14. The method of claim 13, wherein reading of diagnostic data includes ordering of the reading the diagnostic data.

15. The diagnostic tool of claim 13, wherein reading of diagnostic data includes selecting and communicating with certain modules of the vehicle from a plurality of modules.

16. The diagnostic tool of claim 10, further comprising displaying a list of users or a group of users for selection.

17. The diagnostic tool of claim 10, further comprising connecting a signal translator with a vehicle interface through one of a wired and wireless link to allow for recording of the diagnostic data between the diagnostic tool and the vehicle.

18. The diagnostic tool of claim 10, wherein diagnostic trouble codes detected are displayed through a display according to the user information, where the user information includes a single user or a group of users, the group of users being defined by a certain common criteria.

19. A system for a diagnostic tool of a vehicle, comprising:

a means for linking the diagnostic tool with a diagnostic computer of the vehicle through a data link connector of the vehicle;

a means for communicating with the diagnostic computer of the vehicle in a communication protocol;

a means for receiving a selected information of a user and configuration of the diagnostic tool and correlating the configuration information with the user information;

a means for processing a received diagnostic data according to the selected configuration information corresponding to the selected user information;

a means for storing the configuration information according to the corresponding user information; and a means for displaying diagnostic information according to the selected stored configuration information according to the user information.

20. The system of claim 19, wherein the means for storing the configuration information according to the user information is a non-volatile memory unit.

21. The system of claim 19, wherein the means for processing accepts a selection of the stored configuration according to the user information and processes the diagnostic data according to the selected stored configuration.

22. The system of claim 19, wherein the configuration information includes any one of a display configuration and reading of the diagnostic data.

23. The system of claim 19, wherein the means for processing configures the order of reading the diagnostic data based on the configuration information.

24. The system of claim 19, wherein the means for processing selects and communicates with certain modules of the vehicle from a plurality of modules based on the configuration information.

25. The system of claim 19, wherein diagnostic trouble codes detected are displayed through the means for displaying according to the user information, where the user information includes a single user or a group of users, the group of users being defined by a certain common criteria.

* * * * *